United States Patent Office 3,703,527
Patented Nov. 21, 1972

---

3,703,527
PREPARATION OF MANNICH-BASES
Gabriel Saucy, Essex Fells, N.J., assignor to
Hoffmann-La Roche Inc., Nutley, N.J.
No Drawing. Continuation-in-part of application Ser. No.
679,989, Nov. 2, 1967, now Patent No. 3,544,598, which
is a continuation-in-part of application Ser. No. 633,730,
Apr. 26, 1967, now abandoned, which is a continuation-
in-part of application Ser. No. 604,124, Dec. 23, 1966,
now abandoned, which in turn is a continuation-in-part
of application Ser. No. 549,816, May 13, 1966, now
abandoned. This application June 4, 1969, Ser. No.
830,491
Int. Cl. C07d 85/22
U.S. Cl. 260—307                                13 Claims

ABSTRACT OF THE DISCLOSURE

Mannich-bases are prepared by the reaction of vinyl carbinols with manganese dioxide in the presence of primary or secondary amines. In preferred embodiments $\gamma$, $\delta$ or $\epsilon$ hydroxy vinyl carbinols are reacted with manganese dioxide in the presence of a secondary amine, e.g., diethylamine to form Mannich bases which are useful as intermediates in the total synthesis of steroids having valuable pharmacological properties.

RELATED APPLICATIONS

The present application is a continuation-in-part of Ser. No. 679,989, filed Nov. 2, 1967, now U.S. Pat. 3,544,598; which in turn was a continuation-in-part of application Ser. No. 633,730, filed Apr. 26, 1967, now abandoned; which in turn was a continuation-in-part of application Ser. No. 604,124, filed Dec. 23, 1966 and now abandoned; and which in turn was a continuation-in-part of application Ser. No. 549,816, filed May 13, 1966, and which is now abandoned.

BACKGROUND OF THE INVENTION

The oxidation of primary and secondary α-olefinic alcohols with manganese dioxide in neutral media to afford the corresponding carbonyl compounds ($\alpha,\beta$-unsaturated aldehydes and ketones) is known in the art. Such reactions have been described for example, by R. M. Evans, Quart. Rev. (London) XIII, 61 (1959); and S. P. Korshunov and L. I. Vereschehagin, Russian Chemical Reviews, 35, 942 (1966). This procedure has also been applied to the preparation of vinyl ketones from vinyl carbinols. E. N. Braude and W. F. Forbes, J. Chem. Soc. 1953, 2208. It is further known that amines will readily add to vinyl ketones. See, for example, K. Bowden, et al. J. Chem. Soc., 1946, 39.

The prior art additionally indicated that certain amines would react readily with manganese dioxide. For example, H. B. Henbest et al., J. Chem. Soc. 1957, 3032, disclosed that N-dialkyl- and N-monoalkyl-aniline reacted with manganese dioxide via oxidative attack of the N-alkyl group (>N—methyl→N-formyl). Similarly, J. H. Atkinson et al., J. Chem. Soc., 1964, 893, reported that imines of the type (—NH—CH₂—) were dehydrogenated to yield compounds of the type (—N=CH—). Thus, there was basis in the prior art for predicting that introduction of primary or secondary amines into a reaction mixture containing manganese dioxide would result in the formation of degradation products of the amino compounds.

BRIEF DESCRIPTION OF THE INVENTION

In its broadest aspects the present invention relates to a process wherein a compound of the formula

where R is alkyl, substituted alkyl, or aryl; is reacted with an amine of the formula

wherein $R_1$ taken independently is hydrogen or lower alkyl; $R_2$ taken independently is lower alkyl or aralkyl and $R_1$ and $R_2$ taken together with the adjacent nitrogen atom form a 5 or 6 membered saturated heterocyclic ring including at the most one further hetero atom selected from the group consisting of nitrogen and oxygen; in the presence of manganese dioxide to yield compounds of the formula

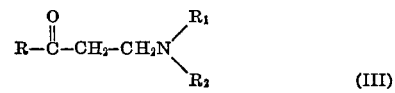

where R, $R_1$ and $R_2$ are as above.

As used herein the term "alkyl" comprehends saturated branched or unbranched hydrocarbon groups having from 1 to 15 carbon atoms. The term "lower alkyl" is meant to include alkyl groups having from 1 to 7, preferably 1 to 4 carbon atoms. Examples of suitable lower alkyl groups include methyl, ethyl, propyl, isopropyl, butyl, tertiary butyl, etc. The term "aralkyl" includes phenyl-lower alkyl radicals such as, for example, benzyl groups. The 5 or 6 membered saturated heterocyclic rings include, for example, the pyrrolidinyl, piperidinyl and morpholinyl groups, among others. The term "substituted alkyl" comprehends an alkyl group substituted with one or more of the following: oxo group, protected oxo group, such as for example, a ketal or thio-ketal, a hydroxy group, a protected hydroxy group, such as for example, a lower acyloxy or lower alkoxy group; a carboxyl or lower alkyl carboxy group, e.g., a 3-carboxy-methylpropyl group or a heterocyclic group, such as for example, an isoxazole group.

The starting materials useful in the practice of this invention corresponding to Formula I may be readily prepared in general by reacting an aldehyde of the following formula

where R is as above with a vinyl Grignard, e.g., vinyl magnesium halides such as the chloride, bromide or iodide, most preferably vinyl magnesium chloride. This reaction may be conducted conveniently at reaction conditions conventionally employed for Grignard reactions and which are now well known in the art, e.g., in an ethereal solvent such as tetrahydrofuran and at a temperature in the range of from about 0° C. to about 50° C. It should be noted that when the definition of R includes oxo or carboxyl groups these groups should be converted to their ketal or thioketal or ester derivatives prior to the reaction in a manner known per se to avoid undesired reactions with the Grignard reagent. These oxo or carboxyl groups can be regenerated after the reaction of this invention if desired by hydrolysis procedures known in the art.

Starting materials may also be prepared by reacting aldehydes of Formula IV with reactive forms of acetylene, e.g., alkali acetylides such as lithium acetylide, sodium acetylide, potassium acetylide or an acetylene Grignard such as acetylene monomagnesium bromide. The reaction with alkali acetylides can be conducted in a solvent such as liquid ammonia, tetrahydrofuran or t-butanol at a temperature in the range between about —50° C. to 30° C. The reaction with acetylene Grignard is conducted in tetrahydrofuran at a temperature between about —20° C. to 50° C. The product of this reaction is then partially hydrogenated using a "poisoned" palladium catalyst (e.g., Lindlar catalyst) at normal conditions using a hydrocarbon solvent, e.g., toluene, benzene, xylene, hexane, etc. As before, reactive groups in the alkyl chain should be in protected form during this reaction.

In one aspect of the present invention alkyl-keto-alkyl-amines of the following formula

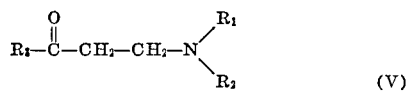

(V)

where $R_3$ is alkyl and $R_1$ and $R_2$ are as above; are prepared from the corresponding compounds of Formula I wherein R is alkyl by utilizing the oxidative amine addition of the present invention wherein amines of Formula II are added to the indicated compounds of Formula I in the presence of manganese dioxide. In preferred embodiments of this aspect of the invention the amino compounds of Formula II are secondary amines, most preferably diethylamine. Examples of representative alkyl groups useful in this aspect of the invention include methyl, ethyl, propyl, isopropyl, butyl, pentyl, hexyl, decyl, dodecyl and pentadecyl among others. The n-hexyl group is a preferred alkyl group.

Another preferred aspect of the present invention relates to the preparation of compounds of the following formula

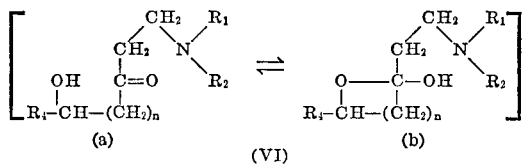

(VI)

where $R_1$ and $R_2$ are as above; $R_4$ is hydrogen, alkyl or substituted alkyl and $n$ is an integer from 2 to 4.

Compounds of Formula VI are conveniently prepared by reacting a compound of the following formula

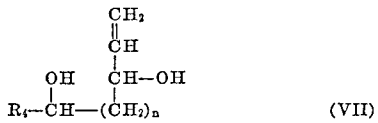

(VII)

where $R_4$ and $n$ are as above; with an amine of Formula II in the presence of manganese dioxide in accordance with the present invention.

It should be noted that compounds of Formula VI are believed to exist in solution in two tautomeric forms as indicated above by Sub-Formulae VI(a) and VI(b), respectively. The cyclic structure of Formula VI(b) is believed to be the lower energy form and is thus favored in the tautomeric equilibrium under most conditions. However, evidence for the existence of Formula VI(a) is observed in the infrared wherein carbonyl stretching absorption peaks are observed. It is to be understood, however, that the absolute structure of compounds of Formula VI is not critical to the context of the present invention. For purposes of convenience, compounds of Formula VI will be named as either the cyclic or open form it being understood that the compound will generally exist as the equilibrium mixtures of these forms.

In one preferred embodiment of the present invention $R_4$ is alkyl and most preferably is an ethyl group. Preferred embodiments wherein $R_4$ is substituted alkyl include a pentyl group containing the following substituents in the δ-position: oxo and protected oxo groups, e.g., ketals and thioketals; and hydroxy or protected hydroxy groups such as acyloxy, preferably acetyloxy or alkoxy, preferably tertiary alkoxy, most preferably t-butoxy; or an ethyl group bearing on the β-carbon atom an isoxazole ring of the following formula:

(VIII)

where R' is lower alkyl or hydrogen and R'' is lower alkyl, lower alkaryl, aralkyl and hydrogen.

Illustrative examples of isoxazoles of Formula VIII include the following groups: 3,5-dimethyl-4-isoxazolyl, 3-methyl-4-isoxazolyl, 3,5-diethyl-4-isoxazolyl, 5-ethyl-4-isoxazolyl, 3-methyl-5-phenyl-4-isoxazolyl, 3-ethyl-4-isoxazolyl and the like.

The value of $n$ in a most preferred aspect of the present invention is 3. The amines of Formula II useful in the oxidative addition process of the present invention may be primary or secondary amines. Suitable primary amines include, for example, the lower alkyl amines such as methylamine, ethylamine, propylamine, n-butylamine, hexylamine, etc., preferably n-butylamine; aralkylamines such as α-methylbenzylamine or amines of complex molecules such as, for example, dehydroabietylamine. The secondary amines most preferably include di-lower alkyl amines, which may contain additional substituents on the alkyl groups, e.g., phenyl; or cyclic amines having 5 or 6 membered saturated rings. Examples of di-lower alkyl amines include dimethylamine, diethylamine, methylethylamine, desoxyephedrine (2-methyl-1-phenylethylamine) etc., with diethylamine being of greatest preference. Examples of cyclic amines include pyrrolidine and piperidine, while morpholine is an example of a cyclic amine having an additional heterocyclic atom.

The oxidative amine addition process of the present invention is generally conducted at a temperature in the range of from about 10 to 60° C., most preferably in the range of from about 20 to 30° C., it being understood that the reaction is slightly exothermic and the reaction temperature may be somewhat higher than the original mixing temperature. The reaction may be conducted in the presence of an added inert organic solvent, such as, for example, an aliphatic hydrocarbon such as hexane; a chlorinated hydrocarbon such as, for example, dichloromethane or chlorobenzene, e.g., chlorobenzene or dichlorobenzene; or an aromatic hydrocarbon such as benzene, toluene or xylene. The manganese dioxide used in this process is preferably an "active" grade which material is obtainable as an article of commerce.

Examples of suitable ketal or thioketal groups useful in the practice of the present invention include, for example, 1,2-ethylenedioxy, 2,2-dimethyl-1,3-propylenedioxy, 1,2-propylenedioxy, 2,3-butylenedioxy, phenylenedioxy or 1,2-ethylenedimercapto. Examples of alkoxy groups useful in the practice of the present invention include groups such as methoxy, ethoxy, t-butoxy, and the like.

The present process is generally useful for the preparation of aminoketones of the general Formula III above. The aminoketones of Formula III are useful as intermediates in the preparation of corresponding α,β-unsaturated ketones which may be obtained by treatment of the former compounds with base, e.g., sodium hydroxide. These α-β-unsaturated ketones can be employed as flavoring agents, aromatics and are also useful as intermediates in the synthesis of steroids having pharmacological activity. However, the process of the present invention is particularly useful in the preparation of compounds of Formula VI where $n$ is 3 which compounds are important intermediates in the total synthesis of steroidal compounds having valuable pharmacological properties. A description of the manner in which such compounds of Formula VI are useful in a process for the preparation of steroids is described in some detail in Belgian Pat. No. 698,390 published Nov. 13, 1967, in U.S. Pat. application Ser. No. 778,314, filed Nov. 22, 1968, inventors Gabriel Saucy and John William Scott; and in the parent applications of this case cited above.

The process of the present invention will be more clearly understood by reference to the following examples which are presented for the purposes of illustration only.

Example 1

In a 3-liter, three-necked flask fitted with a mechanical stirrer and reflux condenser there was dissolved 25.2 g. of 1-hepten-3,7-diol in 700 ml. of 1,2-dichloroethane which had previously been shaken with anhydrous potassium carbonate and filtered before use. A total of 100 ml. of diethylamine was added to the mixture which was maintained under nitrogen atmosphere. Then 208 g. of activated manganese dioxide was added while the mixture was cooled with an ice bath. After addition, the reaction mixture was left stirring at room temperature under a nitrogen atmosphere for one day. It was then filtered and the solid washed thoroughly with benzene. Evaporation of the combined filtrates at 40° C. under 20 mm. Hg followed by evaporation at 1 mm. Hg yielded 34.6 g. of crude 2-(2-diethylaminoethyl)-2-hydroxy-tetrahydropyran as a dark brown oil. Thin-layer chromatography showed a small amount of starting material plus traces of two less polar compounds.

For purification, 31.6 g. of crude product was dissolved in 50 ml. of ethyl aceate cooled to about 7° C. and treated with 200 ml. of 1.2 N hydrochloric acid. Extraction with 3× 100 ml. of ethyl acetate removed starting material and by-products. The aqueous extracts were combined and made basic with cooling by the addition of 30 ml. of 10 N sodium hydroxide. Extraction with 4× 200 ml. of benzene followed by washing the combined extracts with 2× 200 ml. of saturated sodium chloride solution, drying over anhydrous sodium sulfate, filtering, and evaporation of the filtrate at 40° C. under 20 mm. Hg and then finally under 1 mm. Hg yielded 25.3 g. (71 percent) of 2-(2-diethyl-aminoethyl)-2-hydroxy-tetrahydropyran (Formula VI(b): $R_1=R_2=$ethyl; $R_4=$hydrogen and $n=3$) which showed one spot on TLC.

Example 2

A total of 10.0 g. of 3,7-dihydroxy-1-nonene was dissolved in 300 ml. of benzene and 20 ml. of distilled diethylamine. To this solution was added with vigorous stirring at 25° C., 60 g. of activated manganese dioxide. The reaction mixture was then stirred at 25° C. for fifteen hours followed by an additional period of five hours at 45° C. The manganese dioxide was filtered off and the solid washed three times with 50 ml. portions of benzene. The combined benzene solutions were evaporated to dryness at 45° C. The residue may be purified as per the procedure of Example 1 to yield 1-diethylamino-7-hydroxy-nonan-3-one (Formula VI(a): $R_1=R_2=R_4=$ethyl and $n=3$) as a brown oil.

Example 3

A solution containing 22.0 g. of 11,11-ethylenedioxy-1-dodecene-3,7-diol in 600 ml. of benzene and 40 ml. of diethylamine was treated with vigorous stirring with 108 g. of manganese dioxide at 25° C. After stirring for 18 hours at room temperature, the manganese dioxide was filtered off and washed with benzene. The combined benzene filtrates were evaporated and purified as in Example 1 to yield 2-(2-diethylaminoethyl)-6-(4,4-ethylenedioxypentyl) - 2 - tetrahydropyranol (Formula VI(b): $R_1=R_2=$ethyl, $R_4=$4,4-ethylenedioxypentyl and $n=3$) as a brown oil.

The starting material may be prepared as follows:

To 20 g. of magnesium turnings in a 500 ml. flask equipped with Dry-Ice condenser, thermometer, and dropping funnel, 30 ml. of tetrahydrofuran was added followed by the dropwise addition of vinyl chloride solution (200 ml.; 26 percent solution in tetrahydrofuran), while the oil bath in which the flask was emersed was maintained at 70° C. The vinyl chloride was added at such a rate so that the reaction temperature remained at 46–52° C. Iodine vapor and methyl iodide were used to initiate the reaction.

Upon completion of the addition of the vinyl chloride, the reaction mixture was cooled to −5° C. and 6-[4,4-(ethylenedioxy)pentyl]-2-tetrahydropyranol (44.63 g.) dissolved in 150 ml. of tetrahydrofuran was added dropwise to the Grignard reagent at −5° C. to 0° C. The resulting mixture was stirred overnight at room temperature.

The solution was then treated with ice and ammonium chloride solution (200 ml.) and the mixture extracted three times, each time with 500 ml. of chloroform. The organic phase was washed once with ammonium chloride solution and twice with water, and then dried over anhydrous sodium sulfate. Removal of the solvent in vacuo afforded crude 11,11 - ethylenedioxy - 3,7 - dihydroxy-1-dodecene as a pale yellow liquid which solidified upon refrigeration.

The crude product was recrystallized once from isopropyl ether-hexane to give clusters of colorless needles, which upon three additional recrystallizations from the same solvent provided 11,11-ethylenedioxy-3,7-dihydroxy-1-dodecene melting at 52–54° C.

Example 4

A total of 10 g. of 3,7-dihydroxy-11,11-(2′,3′) butylene-dioxydodec-1-ene was treated with 50 g. of manganese dioxide in a solution of 300 ml. of benzene and 78 ml. of diethylamine at 25° C. for one hour. Workup in the manner indicated for Example 1 yielded 2-(2′-diethylaminoethyl) - 6 - [4,4 - (2′,3′)-butylenedioxypentyl]-2-tetrahydropyranol (Formula VI(b): $R_1=R_2=$ethyl, $R_4=$4,4-(2′,3′)-butylenedioxypentyl and $n=3$) which was found to be uniform by thin-layer chromatography.

The starting material may be prepared as follows:

A total of 28.5 g. of 6 - [4,4 - (2′,3′ - butylenedioxy)-pentyl]-2-tetrahydropyranol dissolved in 285 ml. of tetrahydrofuran is added to 145 ml. of a 21 percent solution of vinyl magnesium chloride (based on the magnesium ions present) in tetrahydrofuran at 25° C. over a period of fifteen minutes. After stirring for twelve hours at 25° C., the reaction mixture was poured onto an ice-ammonium chloride mixture and then extracted with three portions of benzene, and washed with a saturated aqueous solution of sodium carbonate. The organic phase is then dried over sodium sulfate, filtered and evaporated in vacuo at 35° C. Upon evaporation, 33 g. of 3,7-dihydroxy-11,11-(2′,3′)-butylenedioxy-dodec-1-ene were produced in the form of an oil which showed one spot using thin-layer chromatography.

Example 5

A total of 41.3 g. of 3,7-dihydroxy-11-t-butoxy-dodec-1-ene was dissolved in benzene and added to a slurry of 320 g. of activated manganese dioxide in 1600 ml. of benzene containing 120 ml. of diethylamine. The reaction mixture was stirred at room temperature for 20 hours and filtered free of solids. Removal of the solvent in vacuo gave a pale brown oil. The oil was dissolved in ether and extracted with aqueous 1 N hydrochloric acid. Sodium hydroxide was added to the acid extract. Extraction into ether and evaporation of the solvent yielded 2-[2′-diethylaminoethyl] - 6 - [4-t-butoxy-pentyl]-2-tetrahydropyranol as a dark yellow oil (Formula VI(b): $R_1=R_2=$ethyl, $R_4=$4-t-butoxypentyl and $n=3$).

The starting material may be prepared as follows:

A total of 10 g. of magnesium metal was activated with a crystal of iodine employed in vapor form, then the metal was covered with dry tetrahydrofuran (20 ml.). Five drops of dibromoethane were then added to the ether solution and the mixture was stirred at reflux for fifteen minutes. 5-chloro-2-t-butoxypentane was then added to the reaction mixture in two stages as follows:

To initiate the reaction, 20 ml. of the chloro-ether containing 63.5 g./250 ml. was added to the reaction mixture. After the reaction was under way (which can vary from between fifteen minutes to twenty-four hours), the remainder of the solution consisting of 230 ml. was added over a period of one hour. The reaction mixture was then heated under reflux for an additional hour, cooled and filtered free of solids.

The above Grignard solution was added to a solution of 39 g. of gluteraldehyde, freshly distilled in tetrahydrofuran (400 ml.) at $-25°$ C. After agitating for an additional 15 minutes at $-25°$ C., the reaction was kept at 0° C. for one hour. A total of 650 ml. of a 20 percent aqueous ammonium chloride solution was then added and the pH was adjusted to 4 with 100 ml. of 1 N dilute hydrochloric acid. Extraction with ether gave 91 g. of a crude oil, the hemiacetyl, 6-[4-t-butoxy]-2-tetrahydropyranol. The crude product was purified by stirring with 650 ml. of a 20 percent solution of sodium sulfite and the pH was adjusted to 6.5 with glacial acetic acid. The pH was then readjusted to 7.5 by means of 20 percent aqueous sodium hydroxide. After further agitation for one hour at 40° C., the reaction mixture was extracted with ether. The aqueous layer was then adjusted to a pH of 12.5 with aqueous 20 percent sodium hydroxide and again extracted with ether. Evaporation of the ether in vacuo gave 6-[4-t-butoxy]-2-tetrahydropyranol as a liquid.

A total of 4.6 g. of 6-[4-t-butoxy]-2-tetrahydropyranol was dissolved in 200 ml. of tetrahydrofuran and added slowly over a twenty minute period to a solution of 300 ml. of vinyl magnesium chloride in tetrahydrofuran at 0° C. After agitation for an additional hour at room temperature, 200 ml. of ether was added which was followed by the addition of 100 ml. of a twenty percent aqueous solution of ammonium chloride. Extraction with ether yielded 3,7-dihydroxy-11-t-butoxy-dodec-1-ene as a waxy solid.

Example 6

A total of 1.488 g. of vinyl-n-hexylcarbinol was dissolved in 50 ml. of benzene containing 3 ml. of diethylamine and was then treated with stirring with 9 g. of activated manganese dioxide at room temperature for 20 hours. After workup in accordance with the procedure of Example 1 there was obtained 2.098 g. of crude 1-diethylamino-3-oxo-nonane which was purified as follows:

The above crude product was dissolved in 15 ml. of the ether and the resulting solution extracted three times with 1 N hydrochloric acid (10 ml. each). The combined hydrochloric acid extracts were first back extracted with ether and then neutralized with 10 N sodium hydroxide solution to bring the pH to 11. Extraction with 4×10 ml. of benzene and evaporation of the benzene gave 1-diethylamino - 3 - oxo-nonane (Formula V: $R_1=R_2=$ethyl and $R_3=$n-hexyl) as an oil which showed one spot on thinlayer chromatography.

Example 7

A mixture consisting of 1.0 g. of 3,7-dihydroxy-1-nonene, 50 ml. of benzene, 0.766 g. of $(\pm)$-$\alpha$-methylbenzylamine and 10 g. of activated manganese dioxide was stirred for 60 hours at 25° C. After workup in the manner of Example 1 the residual oil was passed through a column of alumina (Grade III neutral) and eluted with benzene. Evaporation of the benzene yielded 2-hydroxy-2 - (($\pm$) - $\alpha$-methylbenzylamine)-6-ethyltetrahydropyran (Formula VI(b): $R_1=$hydrogen, $R_2=(\pm)$ - $\alpha$ - methylbenzyl, $R_4=$ethyl and $n=3$) as an oil. This product when treated with oxalic acid formed a crystalline oxalate, melting point 237–239° C. (from acetone-ether).

The above procedure may be utilized with the optical enantiomers of $\alpha$-methylbenzylamine to produce the corresponding product containing the optically active amino function. Thus a solution of 2.0 g. of 3,7-dihydroxy-1-nonene and 2.29 g. of $(\pm)$-$\alpha$-methylbenzylamine in 100 ml. of benzene was treated with vigorous stirring at 25° C. with 16.0 g. of manganese dioxide. After stirring for 18 hours the manganese dioxide was filtered off and washed with 2×50 ml. of benzene. After evaporation of the benzene, crude 2-hydroxy-2-(($\pm$)-$\alpha$-methylbenzylamino)-6-ethyltetrahydropyran was obtained, which was purified by chromatography on a column of 175 g. of alumina. Fractions of 175 ml. each were taken as follows: 1–3=benzene, 4–6=benzene-triethylamine (9:1) and 7–9=benzene-triethylamine (4:1). Fractions 2–5 yielded a total of 2.88 g. of the purified product. The oxalate salt may be obtained by treating 660 mg. of the aforesaid product in 10 ml. of acetone with a solution of 214 mg. of 99.0 percent anhydrous oxalic acid powder in 5 ml. of acetone. After standing at 25° C. for sixty-five hours the precipitated crystals were filtered off and washed with 2×5 ml. of acetone to yield 417 mg. of the oxalate melting at 124–126° C., $[\alpha]_D^{25}=+27.4°$ (c.=1.0 methanol).

Example 8

A total of 1.0 g. of 3,7-dihydroxy-1-nonene was dissolved in 50 ml. of benzene containing 2 ml. of pyrrolidine and the solution treated with activated manganese dioxide. After stirring for 20 hours at 25° C., the reaction mixture was filtered and evaporated to afford 1.71 g. of crude product. This material was purified by chromatography on a column of 51 g. of silica gel. Elution with 50 ml. fractions each of benzenetriethylamine (19:1) followed by evaporation of the solvents gave a total of 1.113 g. of 2-(2 - pyrrolidinoethyl)-2-hydroxy-6-ethyl-tetrahydropyran (Formula VI(b): $R_1$ and $R_2$ taken together=pyrrolidinyl, $R_4=$ethyl and $n=3$).

Example 9

A mixture containing 1.0 g. of 3,7-dihydroxy-1-nonene, 50 ml. of benzene, 1.8 g. of dehydroabietylamine and 8.0 g. of activated manganese dioxide was stirred at 25° C. for 20 hours. After work-up and chromatography in accordance with the procedure of Example 7, there was obtained 2.1 g. of an oil consisting of 2-(dehydroabietylaminoethyl)-2-hydroxy-6-ethyl-tetrahydropyran (Formula VI(b): $R_1=$hydrogen, $R_2=$dehydroabietyl, $R_4=$ethyl and $n=3$). The product yielded a hydrochloride salt having a melting point of 135–138° C. (from ether-pentane) and an oxalate salt having a melting point of 200–208° C. (from acetone).

Example 10

To a mixture of 17.6 g. of activated manganese dioxide and 6.6 ml. of diethylamine in 50 ml. of benzene was added 1.90 g. of 9-(3,5-dimethyl-4-isoxazoyly)-7-hydroxy-non-1-en-3-one in 50 ml. of benzene. The mixture was stirred overnight at room temperature. The manganese dioxide was then filtered off and washed well with benzene. The combined filtrates were evaporated and the resulting residue was dissolved in ether and extracted with 2 N hydrochloric acid and then washed with water. The combined aqueous and acid extracts were cooled to ice temperature, taken to pH 12 with 10 N sodium hydroxide and extracted with ether. The combined ether extracts were washed with brine and dried over magnesium sulfate. After filtering, the ether solution was concentrated to yield 1.92 g. of 2-(2-diethylaminoethyl)-6-[2-(3,5-dimethyl-4-isoxazolyl)ethyl] - 2-hydroxy-tetrahydropyran (Formula VI(b): $R_1=R_2=$ethyl, $R_4=$2-(3,5-dimethyl-4-isoxazolyl) ethyl and $n=3$), as a pale yellow oil.

The starting material may be prepared as follows:

A solution of 320 ml. (325 g.=2.5 moles) of ethyl acetoacetate, 209 ml. (178 g.=2.5 moles) of pyrrolidine and 600 ml. of reagent grade benzene was heated at reflux with azeotropic removal of water for two hours. The benzene was then removed at reduced pressure and the residue was distilled through a 10-cm. Vigreux column yielding 427 g. of ethyl β-pyrrolidinocrotonate as a light yellow liquid, B.P. 155–156° C./10 mm.

A solution of the ethyl β-pyrrolidinocrotonate (427 g.=2.33 moles), 190 ml. (182 g., 2.43 mole) of nitroethane and 1300 ml. of triethylamine in 1200 ml. of anhydrous chloroform was cooled in an ice bath under nitrogen. A solution of 235 ml. (393 g.=2.56 mole) of phosphorus oxychloride in 400 ml. of chloroform was added at such a rate that the temperature did not rise above 15° C. During the addition, which took place over a three-hour period, a viscous orange precipitate formed. This suspension was then stirred under nitrogen overnight. As much solvent as possible was removed at reduced pressure and the resulting red-brown paste was diluted with water and extracted with ether. The ether solutions were washed sequentially with water, 3 N hydrochloric acid, water, 5 percent sodium hydroxide solution and water, and were dried over anhydrous sodium sulfate. Solvent removal at reduced pressure gave a dark oil which was distilled through a short Vigreux column to give 4-carboethoxy-3,5-dimethyl-isoxazole as a slightly cloudy, colorless liquid of B.P. 100° C./11 mm.

A suspension of 100 g. (2.63 moles) of lithium aluminum hydride in 2.5 liters of anhydrous ether was stirred under nitrogen as a solution of 272 g. (1.61 mole) of the 4 - carboethoxy - 3,5 - dimethylisoxazole prepared as above in 400 ml. of anhydrous ether was added at such a rate as to maintain a gentle reflux. The suspension was stirred at room temperature under nitrogen overnight, during which time an extremely gummy green-gray mass formed in the bottom of the flask. The mixture was cooled in an ice-bath and hydrolyzed with saturated aqueous sodium sulfate solution. Anhydrous sodium sulfate was added to dry the ether solution. The salts were removed by filtration and washed carefully with ether and chloroform. Solvent removal from the filtrates, finally at 50° C./0.1 mm., gave a white crystalline mass. This was triturated with hot ether and then cooled. Filtration gave 3,5-dimethyl-4-hydroxymethyl-isoxazole as white prisms, M.P. 76.5–77.5° C. Concentration of the mother liquors gave a second crop of prisms, M.P. 76.5–78° C.

A solution of 36.3 ml. (60.0 g., 0.5 mole) of thionyl chloride in 50 ml. of methylene chloride was cooled in an ice bath under a very slight negative pressure (for fume removal). A solution of 40.0 g. (0.134 mole) of 3,5 - dimethyl - 4 - hydroxymethylisoxazole in 75 ml. of methylene chloride was added over a 2½ hour period. The resulting solution was stirred at room temperature for 2.0 hours. The solvent was removed at reduced pressure and the residue was distilled to give the desired chloride as a pale yellow liquid, B.P. 91.5–93° C./15 mm.

A solution of 59.6 g. (0.402 mole) of 4-chloromethyl-3,5-dimethylisoxazole, prepared as described above, and 116 g. (0.44 mole) of triphenylphosphine in 1 liter of toluene was heated at reflux under nitrogen for 6 hours. The resulting suspension was cooled and filtered. The filtrate was heated at reflux for an additional 20 hours. The precipitate was again removed by filtration and the combined solids were washed well with ether and benzene. The solvent was removed from the filtrate and the residue was taken up in 150 ml. of fresh toluene and refluxed for an additional 18 hours. Filtration as before gave another small quantity of solid. The combined solids were crystallized from ethanol-ether to give the desired phosphonium salt as a cream-white solid, prisms, M.P. 76.5–78° C.

8.75 (0.20 mole) of 55 percent sodium hydride dispersion was washed under nitrogen with dry pentane to remove the mineral oil. To the flask was added 600 ml. of dimethylsulfoxide (dried over Linde 3A molecular sieves). The resulting suspension was carefully degassed, placed under nitrogen, and heated at 70–75° C. for 1 hour. The Gray-green solution was cooled to approximately 15° C. and 91.6 g. (0.20 mole) of (3,5-dimethyl-4 - isoxazolylmethyl)triphenylphosphonium chloride, prepared as described above, was added in one portion. After approximately 5 minutes, a bright orange precipitate formed in the initially dark red solution. This suspension was stirred at room temperature for 45 minutes. To the mixture was then added, dropwise via syringe, 25.0 g. (0.223 mole) of acrolein dimer (freshly distilled from and into hydroquinone) at such a rate that the temperature remained less than 30° C. (10–15 minutes with water bath cooling). The light orange-brown solution was stirred at room temperature for 20 minutes and then at 60–65° C. for 3 hours. (In some experiments, the mixture became very black during the heating period.) The reaction mixture was cooled, poured onto ice, and slurried until all of the dark oil solidified. The suspension was filtered and the filter cake was washed well with pentane. The filtrates were extracted with pentane and the pentane solutions were washed with water and brine and dried over anhydrous sodium sulfate. Solvent removal gave a slightly orange oil which was distilled from a small quantity of anhydrous potassium carbonate to give the desired product as a colorless liquid, B.P. 83–85° C./0.1 mm.

To a solution of 33.5 g. (0.163 mole) of 3,5-dimethyl-4-(3,4-dihydro-2H-pyran-2-ylvinyl) isoxazole, prepared as described above, in 400 ml. of dioxane, was added 400 ml. of 1 N sulfuric acid and the cloudy solution, which soon cleared, was stirred at room temperature for 1 hour. The mixture was poured into 2 liters of saturated aqueous sodium bicarbonate solution and extracted well with ether. The ether extracts were washed with brine and dried over anhydrous sodium sulfate. Solvent removal gave a colorless oil, the infrared spectrum of which indicated that complete hydration of the enol ether had taken place. This material was taken up in 2 liters of benzene and placed under nitrogen. To the flask was added 400 g. of manganese dioxide and the resulting suspension was stirred at room temperature for 40 hours. The manganese dioxide was removed by filtration and carefully washed with fresh benzene. Solvent removal from the filtrate gave 23 g. of yellow solid. Two crystallizations of this material from benzene-ether gave the desired lactone as a cream-white powder, M.P. 90.0–91.5° C.

A mixture of 16.80 g. (76.0 mmoles) of racemic 7-(3,5 - dimethyl - 4 - isoxazolyl) - 5 - hydroxy - $\Delta^{6}$-heptenoic acid lactone, 400 ml. of ethyl acetate, and 500 mg. of 10 percent palladium on carbon was hydrogenated at room temperature and atmospheric pressure. Uptake (1.25×theoretical) was rapid and ceased after 2 hours. The catalyst was removed by filtration and washed with fresh ethyl acetate. Solvent removal gave a colorless oil which was crystallized from ether at −20° C. to give the desired product as white microprisms, M.P. 59–62° C. A small portion of a similarly prepared sample was crystallized again from ether to give white microprisms of M.P. 61–62.5° C.

$$\lambda_{max.}^{ethanol}\ 220\ m\mu\ (\epsilon=5350)$$

A solution of 10.0 g. (44.8 mmoles) of racemic 7-(3,5-dimethyl-4-isoxazolyl)-5 - hydroxyheptanoic acid lactone, prepared as described above, in 150 ml. of freshly distilled tetrahydrofuran was cooled in a Dry Ice-isopropyl alcohol bath under nitrogen. A 25 percent (weight/volume) solution of vinyl magnesium chloride in tetrahydrofuran (25 ml., 75 mmoles) was added via syringe at a rate such that the temperature remained at approximately −60° C. The mixture was stirred at −70° C. for 15 min., and then carefully hydrolyzed with 5 ml. of methanol. It was then poured onto ice, 24 g. of ammonium chloride and 8 ml. of acetic acid. The resulting solution was extracted with ether and the ether solutions were washed with water, saturated aqueous sodium bicarbonate solution, and saturated brine and dried over anhydrous sodium sulfate.

11

Evaporation of the ether solution yielded racemic 9-(3,5-dimethyl-4-isoxazolo)-7-hydroxynon-1-en-3-one.

Example 11

A total of 6.8 g. of (±)-11,11-phenylenedioxy-3,7-dihydroxydodec-1-ene was dissolved in 250 ml. of benzene containing 20 ml. of diethylamine and 60 g. of manganese dioxide was added and the mixture stirred 14 hours at room temperature under nitrogen. The solids were filtered off, washed well with more benzene and the combined filtrates were evaporated to dryness in vacuo. The dark colored oil was taken up in ether and washed with aqueous hydrochloric acid (1 N; 100 ml.). The acid soluble material was then recovered by ether extraction after making basic with 2 N potassium hydroxide solution. Evaporation of the ether yielded 5.4 g. of (±)-6-(4,4-phenylenedioxypentyl) - 2 - (2 - diethylaminoethyl)tetrahydropyran-2-ol as a brown oil (Formula VI(b): $R_1=R_2$=ethyl, $R_4$=4,4-phenylenedioxypentyl and $n$=3).

The starting material may be prepared as follows:

A total of 100 g. of 5-chloro-2-pentanone was treated with 100 g. of catechol in 600 ml. of benzene containing 2 g. of p-toluenesulfonic acid and heated at reflux in conjunction with a Dean-Stark trap, for 24 hours (16 ml. water formed). After cooling to room temperature the dark colored reaction mixture was washed with 1 N aqueous potassium hydroxide solution and dried over neutral alumina (Activity I). Removal of the solvents in vacuo gave a black colored residue ,138 g.), which on vacuum distillation furnished pure 4,4-(phenylenedioxy)-1-chloropentane (99.5 g.); B.P. 82° C./0.3 mm. Hg.

A total of 6.3 g. of the above chloroketal in 50 ml. of tetrahydrofuran was converted with 1 g. of magnesium metal to the Grignard reagent (it was found that the Grignard reaction will start at 36° C.). After three hours at 36° C. vpc analysis indicated 96 percent Grignard formation. Redistilled glutaraldehyde (3.1 g.) in 20 ml. of tetrahydrofuran cooled at −45° C. was treated rapidly (~15 minutes) with the above reagent and the reaction mixture was warmed to room temperature over a period of about 25 minutes. The mixture was then stirred a further 1 hour at room temperature, quenched with aqueous ammonium chloride solution (15 percent); 75 ml.) and extracted with ether. Removal of the solvent in vacuo gave 8.4 g. of crude (±)-6-(4,4-phenylenedioxypentyl)-tetrahydropyran-2-ol as a liquid showing one major spot on TLC analysis.

A total of 6 g. of the crude hemiacetal prepared above dissolved in 25 ml. of tetrahydrofuran was treated with a solution of vinyl magnesium chloride in tetrahydrofuran (32 ml., 2 molar) at 0° C. After stirring at room temperature for 1 hour, aqueous ammonium chloride solution was added (15 percent; 50 ml.) and the product was taken up with ether. Removal of the solvent in vacuo gave crude (±) - 11,11-phenylenedioxy-3,7-dihydroxydodec-1-ene (6.8 g.) as an oil.

I claim:

1. A process for the preparation of a compound of the formula $$R-\overset{O}{\underset{\|}{C}}-CH_2-CH_2N\diagup^{R_1}_{\diagdown R_2}$$

where R is alkyl, phenyl, alkyl substituted with one or more members selected from the group consisting of oxo, hydrolyzable ketal protected oxo, hydroxy, hydrolyzable ether or ester protected hydroxy, carboxyl, lower alkyl carboxy, or an isoxazole ring of the formula $$\underset{N\diagdown_O\diagup}{R'-\boxed{\phantom{xx}}-R''}$$

where R' is lower alkyl or hydrogen and R'' is lower alkyl, lower alkyl phenyl, phenyl lower alkyl and hydrogen; $R_1$ taken independently is hydrogen or lower alkyl; $R_2$ taken independently is lower alkyl or phenyl lower alkyl and $R_1$ and $R_2$ taken together with the adjacent nitrogen form a 5 or 6 membered saturated heterocyclic ring which may contain one oxygen atom wherein the alkyl group contains up to 15 carbon atoms and the lower alkyl group contains up to 7 carbon atoms which process comprises reacting a compound of the formula $$R-\underset{\underset{OH}{|}}{CH}-CH=CH_2$$

with an amine of the formula $$H-N\diagup^{R_1}_{\diagdown R_2}$$

in the presence of manganese dioxide.

2. The process of claim 1 wherein R is alkyl and said amine is a secondary amine.

3. A process for the preparation of compounds of the formula (a)        (VI)        (b)

where $R_1$ taken independently is hydrogen or lower alkyl; $R_2$ taken independently is lower alkyl or phenyl lower alkyl and $R_1$ and $R_2$ taken together with the adjacent nitrogen atom form a 5 or 6 membered saturated heterocyclic ring which may contain one oxygen atom; $R_4$ is hydrogen, alkyl or alkyl substituted with a member selected from the group consisting of oxo, hydrolyzable ketal protected oxo, hydroxy, hydrolyzable ether or ester protected hydroxy carboxyl, lower alkyl carboxy, an isoxazole ring of the formula $$\underset{N\diagdown_O\diagup}{R'-\boxed{\phantom{xx}}-R''}$$

where R' is lower alkyl or hydrogen and R'' is lower alkyl, lower alkyl phenyl, phenyl lower alkyl and hydrogen and $n$ is an integer from 2 to 4 wherein the alkyl group contains up to 15 carbon atoms and the lower alkyl group contains up to 7 carbon atoms, which process comprises reacting a compound of the formula $$\underset{\underset{R_4-CH-(CH_2)_n}{|\qquad\qquad|}}{\underset{OH\quad CH-OH}{}}\underset{\underset{CH}{\|}}{CH_2}$$

where $R_4$ and $n$ are as above with an amine of the formula $$H-N\diagup^{R_1}_{\diagdown R_2}$$

where $R_1$ and $R_2$ are as above in the presence of manganese dioxide.

4. The process of claim 3 wherein $n$ is 3.

5. The process of claim 4 wherein $R_1$ and $R_2$ are both lower alkyl and $R_4$ is hydrogen.

6. The process of claim 4 wherein $R_1$, $R_2$ and $R_4$ are lower alkyl.

7. The process of claim 4 wherein $R_1$ and $R_2$ are lower alkyl and $R_4$ is 4,4-ethylenedioxypentyl.

8. The process of claim 4 wherein $R_1$ and $R_2$ are lower alkyl and $R_4$ is 4,4-(2',3')-butylenedioxypentyl.

9. The process of claim 4 wherein $R_1$ and $R_2$ are lower alkyl and $R_4$ is 4-t-butoxypentyl.

10. The process of claim 4 wherein $R_1$ and $R_2$ are lower alkyl and $R_4$ is 4,4-phenylenedioxypentyl.

11. The process of claim 4 wherein $R_4$ is ethyl substituted on the β-carbon with an isoxazole ring of the formula

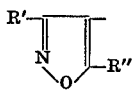

where R' and R" are as above.

12. The process of claim 4 wherein $R_1$ and $R_2$ are both lower alkyl and $R_4$ is 2-(3,5-dimethyl-4-isoxazolyl)ethyl.

13. The process of claim 4 wherein $R_1$ and $R_2$ are taken together with the adjacent nitrogen atom to form a 5 or 6 membered saturated heterocyclic ring which may contain one oxygen atom.

References Cited
FOREIGN PATENTS 698,390  11/1967  Belgium.

OTHER REFERENCES

Leftingwell, "Chemical Abstracts," vol. 71, col. 123529c, 1969.

ALEX MAZEL, Primary Examiner

J. H. TURNIPSEED, Assistant Examiner

U.S. Cl. X.R.

260—247.7, 294, 294.3, 294.7, 326.3, 326.5, 340.5, 340.7, 340.9, 345.9, 347.4, 347.7, 488, 570.5 C, 576, 586 H